Dec. 3, 1940.  J. G. GROHS  2,224,047
IRRIGATION PLOW
Filed March 31, 1939  4 Sheets-Sheet 2
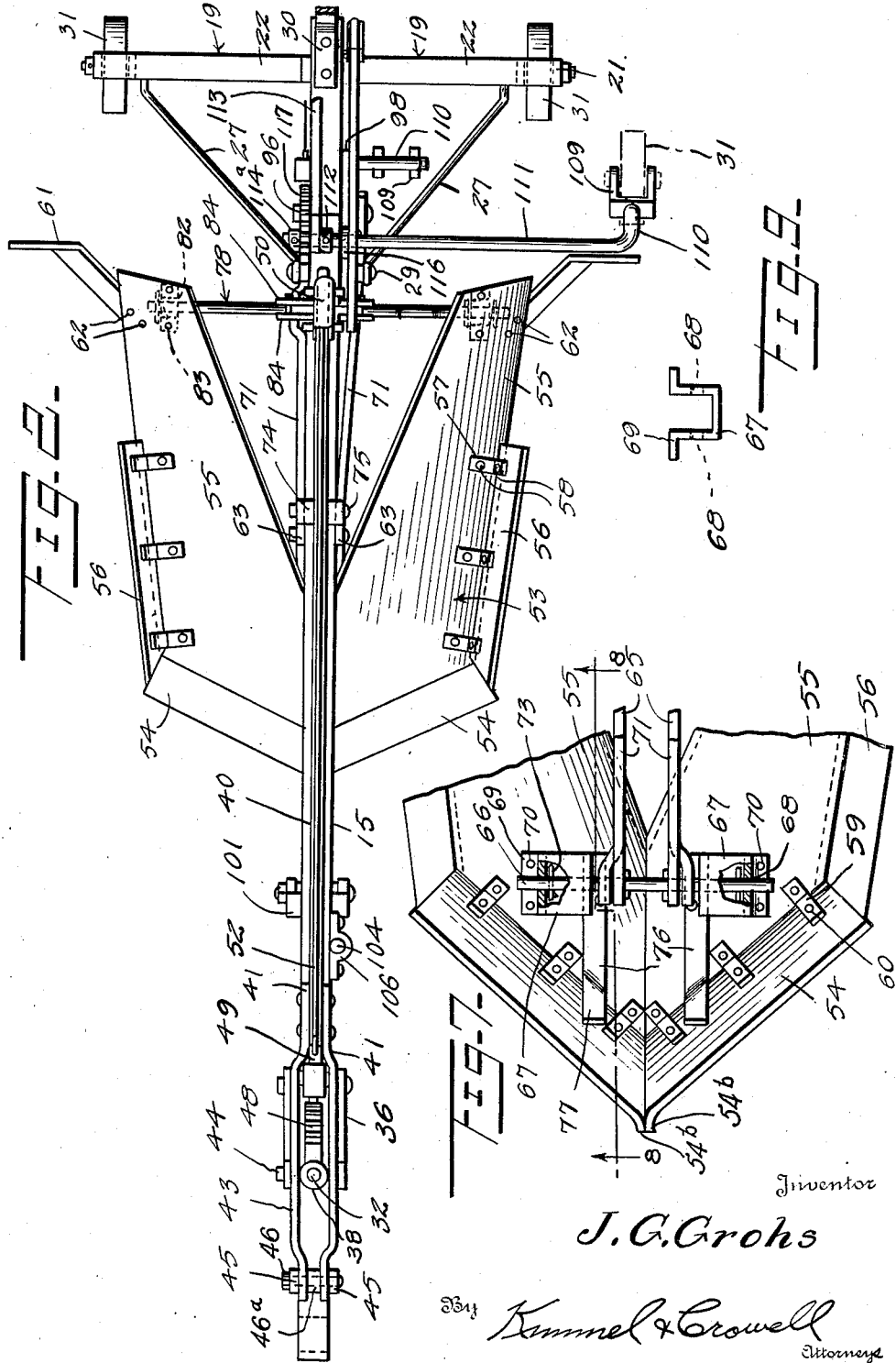
Inventor
J. G. Grohs
By Kimmel & Crowell
Attorneys

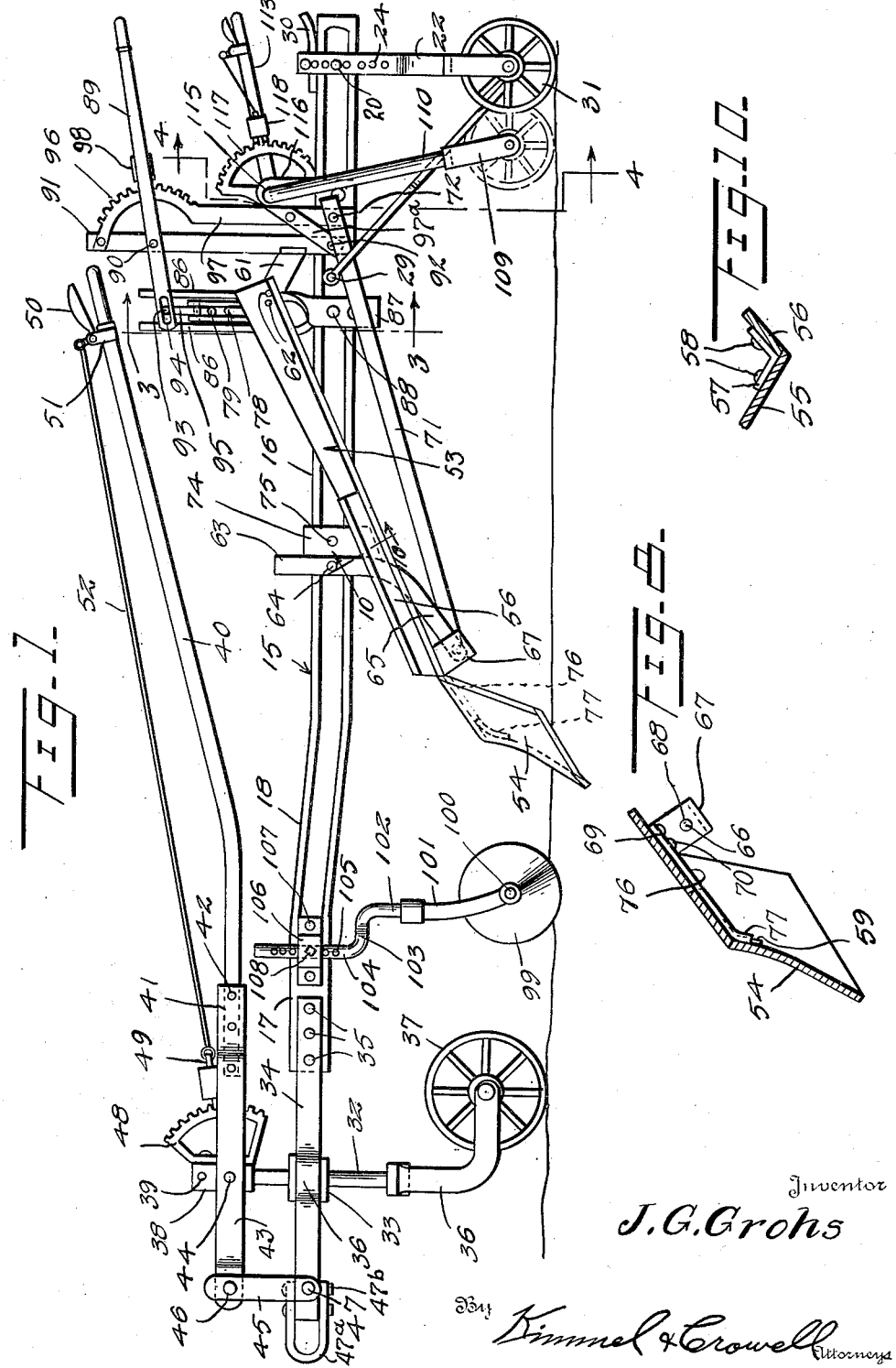

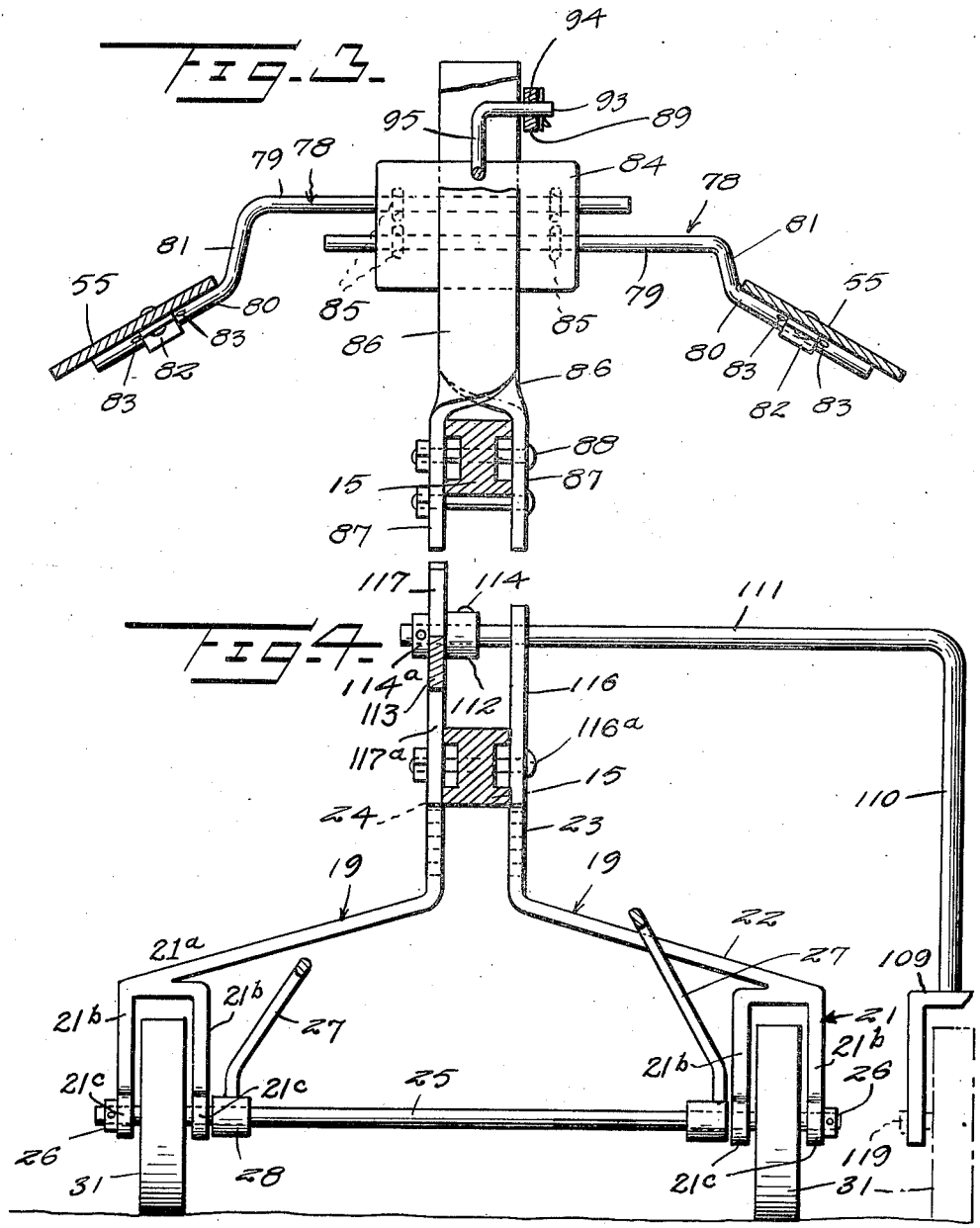

Dec. 3, 1940.  J. G. GROHS  2,224,047
IRRIGATION PLOW
Filed March 31, 1939  4 Sheets-Sheet 4
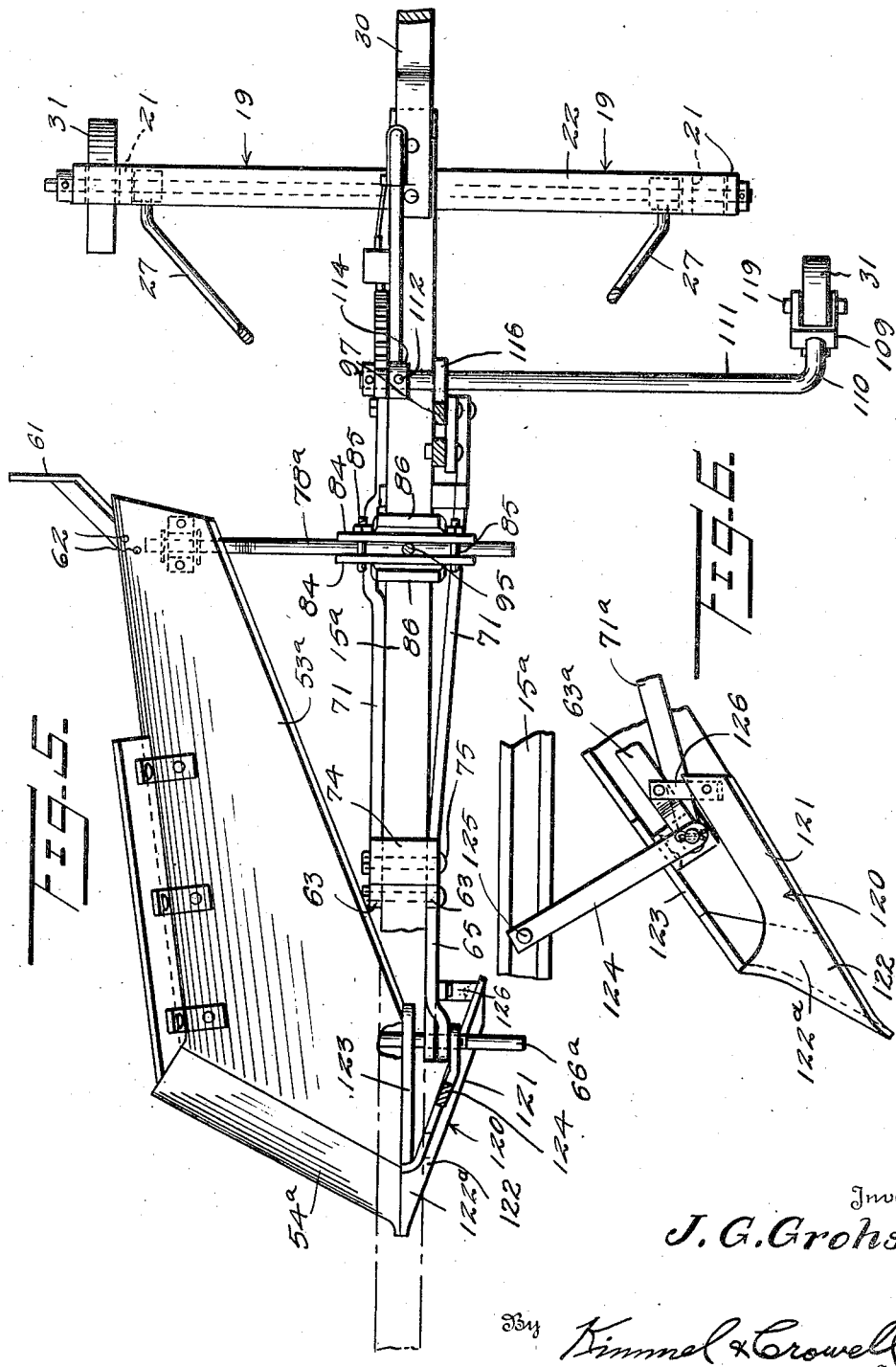
Inventor
J. G. Grohs
By Kimmel & Crowell
Attorneys Patented Dec. 3, 1940

2,224,047

UNITED STATES PATENT OFFICE 2,224,047

IRRIGATION PLOW

John G. Grohs, Great Falls, Mont.

Application March 31, 1939, Serial No. 265,347

10 Claims. (Cl. 37—93)

This invention relates to plows and more particularly to an improved irrigation or ditch digging plow.

An object of this invention is to provide an improved plow structure which is so constructed that it may be used for the purpose of digging irrigation ditches, the device being adaptable to varying conditions encountered in the digging of ditches so that the device may be used for substantially every purpose which arises in the formation of irrigation canals or ditches.

A further object of this invention is to provide a ditch digging machine or plow which is adapted not only to loosen the dirt in a ditch but also to throw the dirt on top of the ground and on one side of the ditch.

A still further object of this invention is to provide a plow structure of this kind which may be used for the purpose of repairing ditches, the plow structure being so constructed that if desired, only one side of the ditch may be worked upon.

A further object of this invention is to provide a plow structure wherein the plow per se may be maintained in a pre-determined or horizontal position irrespective of the inclination of the ditch bottom and irrespective of the width of the ditch or ditch bottom.

To the foregoing objects and to others which may hereinafter appear, the invention consists of the novel, construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detail side elevation of an irrigation plow constructed according to an embodiment of this invention, Figure 2 is a top plan of the device, Figure 3 is a sectional view taken on the line 3—3 of Figure 1, Figure 4 is a sectional view taken on the line 4—4 of Figure 1, Figure 5 is a top plan, partly broken away and in section of a modified form of this invention, Figure 6 is a fragmentary side elevation of the structure shown in Figure 5, Figure 7 is a fragmentary bottom plan of the plow shown in Figures 1 and 2, Figure 8 is a fragmentary sectional view taken on the line 8—8 of Figure 7, Figure 9 is an edge view of one of the frogs carried by the under side of the plow, and Figure 10 is a sectional view taken on the line 10—10 of Figure 1.

Referring to the drawings, the numeral 15 designates generally an elongated frame member in the form of an I-beam which is provided with a straight rear portion 16 and an upwardly offset forward portion 17 which is connected to the forward end of the rear portion 16 by an inclined or upwardly bent portion 18. The rear portion of the frame member 15 is supported by means of a pair of oppositely disposed upstanding parallel angle-shaped supporting members 19 of like form in connection with a fastening means 20 and a shaft 25 for a pair of supporting or traction wheels 31. The fastening means 20 is detachably connected to and extends through the said rear portion of the frame member or beam 15.

Each supporting member 19 comprises a hanger in the form of an upstanding yoke or inverted U-shaped part 21 and an angle-shaped bar formed of an inwardly extending upwardly inclined lower bar portion 22 and a vertically disposed upper bar portion 23. The outer end of the bar portion 22 is integral with the top 21a of the fork 21. The inner end of the bar portion 22 merges into the lower end of the bar portion 23. The sides 21b of the hanger having enlarged annular lower end portions 21c constituting bearings for an end terminal portion of the shaft 25. The latter extends outwardly beyond the hangers. The upper bar portions 23 are provided with vertical rows of superposed spaced aligned openings 24. The fastening means 20 is for mounting in selected pairs of openings 24 whereby the height of the rear portion of the frame member or beam 15 may be readily adjusted. A retaining collar 26 is secured on each end of the shaft 25 and is arranged exteriorly of the outer side of a hanger. A pair of bracing members or bars 27 provided at their lower or rear ends with bushings 28 engage on the shaft 25 inwardly of the hangers 21 and the upper or forward ends of the bracing members 27 are secured as at 29 to the frame or beam 15. A seat supporting post or bar 30 is secured to the rear of the frame member or beam 15 and is adapted to carry a suitable seat for use by the operator of the machine. A wheel 31 is positioned between the arms of each hanger 21 and is rotatable on the shaft 25.

The forward end of the frame member or beam 15 is supported from a vertically disposed shaft 32 which extends through a vertical bushing 33 arranged between and carried by a pair of spaced parallel forwardly projecting bars 34 intermediate the ends of the latter. The bars 34 are secured as by fastening members 35 to the forward end of the forward portion 17 of the frame member or beam 15 and are provided with an arcuate offset portion 36 within which the flanged bushing 33 engages. The shaft 32 is rotatable and vertically slidable relative to the bushing 33 and is provided at its lower end with an L-shaped fork 36 between the arms of which a wheel 37 is rotatably mounted. The horizontal portion of the fork 36 is extended rearwardly and in the rear end of such portion is arranged the wheel 37. The shaft 32 extends above the bars 34.

A sleeve 38 is fixed upon the upper end of the shaft 32 by means of a set screw or fastening member 39. An adjusting lever 40 for the frame member or beam 15 is secured with the sleeve 38 by means of a pair of forwardly projecting bars 41 which are secured with the forward end of the lever or handle 40 by fastening members 42. The bars 41 are provided, intermediate their ends with laterally offset portions 43 within which the sleeve 38 is loosely received. Pins or trunnions 44 engage through the bars 41 and extend into the sleeve 38 so as to rockably secure the lever 40 with the shaft 32. Arranged against the outer sides of the forward end portions of the bars 41 are the upper ends of a pair of parallel links 45. The upper ends of said links are mounted on a pivot 46 extending through said forward end portions and the links and provided with a spacing collar 46a arranged between the bars 41. The lower ends of the links 45 are arranged against the outer sides of the bars 34 and mounted on a pivot 47 extending through said links and bars 34. A forwardly directed clevis 47a is anchored, as at 47b to the bars 34. By this arrangement the vertical swinging of the handle or lever 40 will raise or lower the forward end of the frame member or beam 15. A quadrant or toothed rack 48 is secured to the sleeve 38 and a spring pressed latching member 49 is engageable with the teeth of the rack 48 so as to releasably lock the lever 40 in adjusted position. A latch operating lever 50 is rockably mounted on a clamping member 51 adjacent the rear portion of the lever 40 and is connected to the latch 49 by means of a link or connecting member 52.

A plow formed of a pair of oppositely disposed plow members of like form, generally designated as 53 is disposed beneath the frame member or beam 15 between the wheels 37 and 31. The plow members are laterally disposed with relation to opposite sides of the frame member or beam 15. Each plow member 53 comprises a blade or share 54 and a mold board 55. The blade 54 is formed of a substantially rectangular body of the desired length and width. The blade extends towards the line of draft and at a forward inclination from its outer to its inner end. The blade extends downwardly at a forward inclination from its upper to its lower lengthwise edge and at a downward inclination from its inner to its outer end with relation to the frame member or beam 15. The body of the blade in vertical section is substantially of concavo-convexed contour. The outer end of the blade is outwardly inclined from its upper to its lower lengthwise edge. The inner end of the blade is formed with an angularly disposed forwardly directed portion as at 54b. The forward end of the mold board 55 is disposed at an inclination corresponding to and is secured against the upper lengthwise edge of the blade 54. The mold board 55 extends rearwardly at an upwardly inclination from the said upper lengthwise edge and is disposed at a downward inclination from its inner to its outer side with relation to one side of the frame member or beam 15. The manner of setting up the mold board 55 relative to the blade 54 and the frame member or beam 15 provides to discharge the dirt on the ground above the bottom of the ditch formed by the plow. Secured to the forward portion of the outer side of the mold board 55 and abutting the outer end of the blade 54 is an upstanding outwardly inclined blade 56. The latter is secured to the mold board 55 by the spaced angle-shaped straps 57 and the fastening devices 58. The blades 56 are adapted to cut the sides of the ditch formed by the plow. The forward end of the mold board 55 is secured to the blade 54 by means of the angle-shaped straps 59 and the fastening devices 60. The straps 57 are arranged on the inner face of the blade 56 and upper face of the mold board 55. The straps 59 are arranged on the rear face of the blade 54 and lower face of the mold board 55.

Each mold board 55 at its upper or rear end is provided with an extension 61 secured by a fastening member 62 which is adapted to project upwardly and laterally of the outer edge of a mold board 55 so as to force the loosened dirt laterally of the upper edge of the ditch.

The plow members 53 are supported from the frame 15 by means of a pair of supporting bars 63 which are secured as by fastening members 64 on opposite sides of the frame 15. Each bar 63 is provided with an obtusely disposed lower portion 65 which engages a shaft 66. The shaft 66 is loosely disposed in a pair of spaced parallel U-shaped frogs 67 provided with endwise aligned shaft openings 68. Each frog 67 is provided with flanges 69 secured as by fastening members 70 to the under side of a mold board 55. A pair of bracing bars 71 are secured as by fastening members 72 to the beam or frame member 15 rearwardly of the supporting bars 63 and extend forwardly and downwardly, being mounted on the shaft 66 as shown in Figure 7. The shaft 66 is held against endwise movement relative to the two frogs or U-shaped members 67 by means of cotter pins 73. The supporting bars 63 are braced on the beam or frame member 15 by means of a U-shaped bracing member or wedge 74 which engages on opposite sides of the beam 15 with the bight thereof on the upper side of the beam 15 and with the forward edge thereof abutting against the rear edges of the supporting bars 63. The bracing member 74 is secured as by a fastening member 75 to the beam 15. Each frog or U-shaped member 67 is provided with a forwardly projecting arm 76 which has a downwardly inclined forward end portion 77 engaging beneath the blade member 54 so as to provide an additional bracing means for the blade member 54.

The rear ends of the plow members 53 are adjustably supported by means of a pair of oppositely disposed bars 78, substantially of like form which have their outer end terminal portions connected with the inner faces of the mold boards 55. The bars 78 extend inwardly over the frame member or beam 15. Each bar 78 includes a horizontally disposed inner portion 79, a downwardly inclined outer portion 80 offset with respect to the portion 79 and an inwardly inclined coupling portion 81 merging into the outer end of portion 79 and the inner end of portion 80. The outer portion 80 extends loosely through a bearing 82 fixed to the under side of a mold board 55 and which is connected with the latter by a pair of spaced cotter pins 83 extending through said portion 80 and arranged at opposite sides of the bearing 82. The inner portion 79 of one bar 78 is disposed in superposed parallel spaced relation with respect to the inner portion of the other bar 78. The two horizontal bar portions 79 are secured to a slide plate 84 by means of bolts or fastening members 85. The plate 84 is slidable between a pair of vertically disposed guide bars 86 which are provided at the lower ends with a twisted lower portion 87 secured as by fastening members 88 to the frame member or beam 15. The upper bar portions 86 are positioned at right angles to the length of the frame member 15. The slide plate 84 is supported in vertically adjusted position by means of an adjusting lever or handle 89 which is pivotally mounted as at 90 on a vertically disposed bar 91. The bar 91 is fixed at its lower end as at 92 to the frame member 15.

An L-shaped connecting member 93 has one leg thereof mounted in an elongated opening 94 provided in the forward end of the lever 89 and the other leg 95 is secured in the central portion of the upper end of the plate 84. A quadrant or toothed arcuate rack 96 has one end thereof secured to the upper end of the lever supporting bar 91. A depending extension 97 is integral at its upper end with the opposite end of the rack 96 and is secured at its lower end to the frame member or beam 15. An upstanding rearwardly inclined brace 97a (Figure 1) is provided for the extension 97. A spring-pressed latching member 98 is carried by the lever or handle 89 and engages between selected teeth of the rack 96 so as to releasably lock the lever 89 in adjusted position.

A disc plow 99 is rotatably mounted on a shaft 100 carried by a fork 101. The fork 101 is mounted on the lower end of a vertically disposed shaft 102 which is provided at its upper end with a right angular extension 103. A vertically disposed shaft 104 provided with a plurality of spaced apart openings 105 is integral with the horizontal or right angular extension 103 and engages through a bearing or bushing 106 secured by fastening members 107 to the frame member 15 forwardly of the forward end of the plow members 53. An adjusting bolt 108 engages through the bushing or bearing 106 and through a selected opening 105 in order to support the disc 99 in vertically adjusted position. The fork 101 may be swivelly mounted on the lower end of the shaft 102.

An auxiliary fork 109 is secured to a bar or shaft 110 which extends vertically from the upper end of the fork 109 and a horizontally disposed shaft 111 is integral with the bar or shaft member 110. The shaft 111 is horizontally adjustable through a hub 112 carried by a shaft adjusting lever 113 and secured as by a bolt 114 to the shaft 111. The shaft 111 is pivotally mounted as at 115 in an upwardly disposed supporting member 116 secured at its lower end, by the holdfast means 116a against one side of rear portion of the frame member or beam 15. A quadrant shaped rack 70 is indicated at 117 and which is formed with a depending extension 117a secured to the other side of the rear portion of the frame member or beam 15 by the said holdfast device 116a. A spring-pressed latching means 118 is carried by the lever or handle 113 and is engageable in selected teeth of the rack 117 so as to thereby lock the shaft 111 in vertically adjusted position. The fork 109 is adapted to receive one of the wheels 31 which is mounted on a stub shaft 119 engaging through the arms of the fork 109. The fork 109 is adapted to be positioned on one side or the other of the frame member or beam 15, this being accomplished by removing the bolt 114 and collar 114a and then turning the shaft 111 so as to thereby position the fork 109 on the desired side of the frame 15. Where this is done, one of the wheels 31 on the shaft 25 is removed and then mounted on the stub shaft 119. In this manner the rear portion of the frame member or beam 15 may be positioned in a ditch which is narrower than the length of the shaft 25. When the plow members 53 are secured together and in abutting engagement the portions 54b of said members 53 provide the plow point.

In Figures 5 and 6, there is disclosed a plow structure wherein only one plow member 53a is secured to the frame member or beam 15a. This plow 53a is identical with one of the plows 53 and the associated parts for supporting the plow 53a are identical with the parts associated with each plow member 53. Where the ditch is relatively narrow or it is only desired to straighten out one side of a ditch, a single plow member 53a as shown in Figure 5 is used. Where this is done a supplemental plow 120 is associated with the plow 53a. This plow 120 comprises a landside 121, a blade 122 having an inturned part constituting a point 122a and a mold board 123. The inturned part of blade 122a abuts the inner end of the blade 54a of the plow member 53a. The blade 122 extends rearwardly from blade 54a at an outward inclination and also inclined at an outward inclination from its top to its bottom edge. The land side 121 merges into the rear end of blade 122 and is disposed at the same inclinations as such blade and is placed from the mold board 123. The latter is arranged against the forward portion of the inner side edge of the mold board of the plow member 53a. The mold board 123 at its forward end abuts the portion 122a of the blade 122. The mold board 123 is arranged on its lower lengthwise edge and disposed in perpendicular relation with respect to the said inner edge portion of the mold board of the plow member 53a. The landside 121 is connected with the shaft 66a by a supporting member 63a. The mold board 123 is mounted on shaft 66a. The extending portion of the shaft 66a is braced by means of a bracing bar 124 which is secured as by a fastening member 125 to the frame member or beam 15a. The lower end of the bracing member 124 engages the shaft 66a. The landside 121 is secured to the lower end of a supporting member 63a by means of a bracing member 126. Where the supplemental plow member 120 is used the rear wheel 31 on the same side of the frame 15a is removed and this wheel is then mounted in the fork 109. If desired a short stub shaft may be substituted for the longer shaft 25 for use with the wheel 31 on the fork 21.

In the use and operation of this plow, where it is desired to form a ditch of the width of two of the plow members 53, the structure shown in Figures 1 and 2 is used. The depth of cut of the two plow members 53 may be controlled by adjustment of the lever 40 which will raise or lower the forward portion of the frame 15. The disc 99 will be raised or lowered with the movement of the frame 15 and is adapted to split the dirt forwardly of the plows 53 so that this dirt can readily be thrown to both sides of the ditch formed by the plows.

As the device is moved forwardly the side blades 56 will cut the side edges of the ditch formed by the two plows 53, in addition to keeping the dirt on the mold boards 55 from being crowded or packed along the vertical edges of the ditch formed by the two plows. The blades 56 are shorter in length than the length of the two mold boards 55 so as to thereby provide a discharging passage at the upper ends of the blades 56 which is adjacent the top of the ditch. The supplemental plates or extensions 61 are provided for the purpose of moving the loose dirt away from the upper edges of the ditch.

In the event, the bottom of the ditch is not level or it is desired to support the two plow members 53 at an inclination to the horizontal, one of the wheel supporting bars 19 may be vertically adjusted by loosening the bolt 20 and extending this bolt through a selected opening 24 in the particular supporting member 19.

The inclination of the two plow members 53 may be readily adjusted by adjustment of the lever 89 which is connected to the rear ends of the two plow members 53. The adjustment of this lever 89 will rock the two plow members 53 on the shaft 66 so as to raise or lower the blades 54 and likewise, raise or lower the mold boards 55 and adjust the angle of the mold boards 55 to the horizontal.

Where a relatively narrow ditch is being formed or repaired, one of the plows 53 may be removed and in its place a supplemental plow 120 is mounted on the shaft 66a. Where this is done, the wheel 31 on the same side of the frame member or beam 15a may be removed and if desired, the wheel supporting member 19 may also be removed or raised up. The fork 109 is swung to the side of the frame 15a which has the plow removed therefrom and this wheel fork 109 is provided with a wheel 31, the wheel being the same wheel that is removed from the adjacent fork 21. The inclination of the frame member or beam 15a may be adjusted by vertical adjustment of the fork 109 through the medium of the lever 113. The supplemental plow 120 is used in order to prevent the plow 53a from working laterally or to one side so that this single plow 53a may readily repair the other side of the ditch.

It will be apparent from the foregoing that the rear portion of the low may be so adjusted by adjustment of the supporting members 19 that the wheels 31 may be positioned in different horizontal planes.

What I claim is:

1. An irrigation plow comprising a wheeled frame, a pair of forwardly convergent plow members disposed beneath said frame, vertically disposed guide means carried by said frame, a slide member engaging said guide means, a slide adjusting rock lever connected to said frame and said slide means, means connected to the convergent ends of said plow members swingable supporting the plow members from said frame, a pair of plow supporting bars, means securing an end of each bar to said slide member, and means securing the opposite end of each bar to the divergent ends of said plow members.

2. An irrigation digging means comprising a wheeled frame, a plow member, and means supporting said plow member relative to said frame, said means comprising a U-shaped member secured to said plow member, a shaft carried by said U-shaped member, a supporting bar dependingly carried by said frame and loosely engaging said shaft, and a bracing bar fixed at one end to said frame and having the opposite end thereof mounted on said shaft.

3. An irrigation digging means comprising a wheeled frame, a plow member, and means supporting said plow member relative to said frame, said means comprising a U-shaped member secured to said plow member, a shaft carried by said U-shaped member, a supporting bar dependingly carried by said frame and loosely engaging said shaft, a bracing bar fixed at one end to said frame and having the opposite end thereof mounted on said shaft, an auxiliary wheel supporting member, means slidably securing said auxiliary wheel supporting member on said frame, and means holding said auxiliary wheel supporting member in adjusted position.

4. In a mobile irrigation plow, a horizontally disposed adjustable beam, an extension means at the forward end of the said beam, a front wheel assembly including a vertically disposed shaft extending upwardly through said means intermediate the ends of the latter, a plow structure carried by the beam, a lever structure arranged over said means and beam for elevating and lowering the beam, said shaft extending upwardly through the forward portion of said structure, links pivotally connected at one end to the forward portion of said means and at the other end to the forward end of said structure, said structure being pivotally connected to said shaft, and means carried by the lever structure spaced rearwardly from the pivot connection between said shaft and structure and engageable with a portion of said assembly for latching the lever structure and beam in adjusted position.

5. An irrigation plow comprising a mobile structure including a horizontal beam, a pair of oppositely disposed plow members of like form arranged below said beam intermediate the ends of the latter and extended in lateral relation with respect to opposite sides of said beam, a shaft arranged below and supported from said members, means depending from the beam and engaging with said shaft for pivotally supporting said members from the beam, bracing means secured to the beam and connected to said shaft, and means carried by the beam and loosely connected with and within the rear of said members for angularly adjusting said members in unison on said shaft.

6. In an irrigation plow a pair of pivotally supported simultaneously adjustable oppositely disposed plow members of like form operating in unison and having the forward portions of their inner sides abutting, each of said members including an inwardly extending forwardly inclined forward blade disposed on its lower lengthwise edge, said blade inclining downwardly from its outer to its inner end and including forwardly from its upper to its lower lengthwise edge, a laterally and forwardly downwardly inclined mold board extending rearwardly from the upper lengthwise edge of said blade, a rear blade extending rearwardly from the outer end of the forward blade, said rear blade being arranged at the forward portion of the outer side of the said mold board, said rear blade being disposed upwardly and at an outwardly inclination with respect to the mold board, means for securing the rear blade to the mold board, and means for securing the forward blade to the mold board.

7. In an irrigation plow a pair of pivotally supported simultaneously adjustable oppositely disposed plow members of like form operating in unison and having the forward portions of their inner sides abutting, each of said members including an inwardly extending forwardly inclined forward blade disposed on its lower lengthwise edge, said blade inclining downwardly from its outer to its inner end and inclining forwardly from its upper to its lower lengthwise edge, a laterally and forwardly downwardly inclined mold board extending rearwardly from the upper lengthwise edge of said blade, a rear blade extending rearwardly from the outer end of the forward blade, said rear blade being arranged at the forward portion of the outer side of the said mold board, said rear blade being disposed upwardly and at an outwardly inclination with respect to the mold board, means for securing the rear blade to the mold board, means for securing the forward blade to the mold board, and an angle-shaped extension secured to the rear of and extended outwardly from the outer side edge of the mold board.

8. In an irrigation plow a mobile beam, an inwardly extending forwardly inclined forward blade disposed on its lower lengthwise edge below said beam, said blade inclining downwardly from its outer to its inner end and inclining forwardly from its upper to its lower lengthwise edge, said blade having its inner end formed with an angularly disposed forwardly directed part constituting a point, a laterally and forwardly downwardly inclined mold board extending rearwardly from the upper lengthwise edge of said blade, a rear blade extending rearwardly from the outer end of the forward blade, said rear blade being arranged at the outer side edge of the mold board, said rear blade being substantially of rectangular contour and disposed on its lower lengthwise edge and at an outward inclination with respect to said outer side edge, means for fixedly securing the forward end of the mold board to said front blade, means for fixedly securing the rear blade to the outer side of the mold board, means including a loosely mounted shaft for pivotally supporting the mold board from said beam, and means carried by the beam and loosely connected to the rear of the mold board for angularly adjusting said blades and mold board in unison relative to said shaft.

9. An irrigation plow comprising a beam, a plow structure, a shaft connected to and arranged within the plow structure at the forward portion of the latter, means depending from the beam, extending into said structure intermediate the ends of the latter and correlating with the shaft for pivotally supporting said structure from the beam, means carried by the beam and loosely engaging with and within said structure at the rear thereof for angularly adjusting the said structure on said shaft, and bracing means extended from the beam into the plow structure and connected to said shaft.

10. An irrigation plow comprising a beam, a pair of oppositely disposed forwardly extending downwardly inclined plow elements of like form arranged in abutting relation for a part of their length and inclining outwardly at an upward inclination, a shaft disposed within and transversely of the forward portion of and suspended from said elements, means depending from the beam, extending between said elements intermediate the ends of the latter and correlated with said shaft for pivotally supporting said elements from the beam, means carried by the beam and loosely engaging with the rear ends of said elements for angularly adjusting said elements in unison on said shaft, and spaced parallel bracing means for said elements secured to the beam and connected to said shaft.

JOHN G. GROHS.